United States Patent Office 2,996,994
Patented Aug. 22, 1961

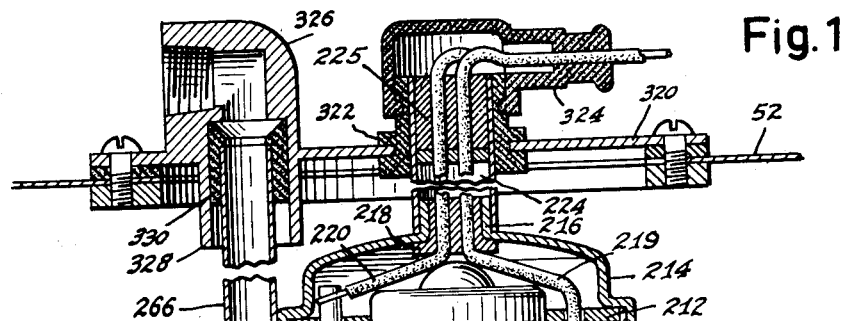
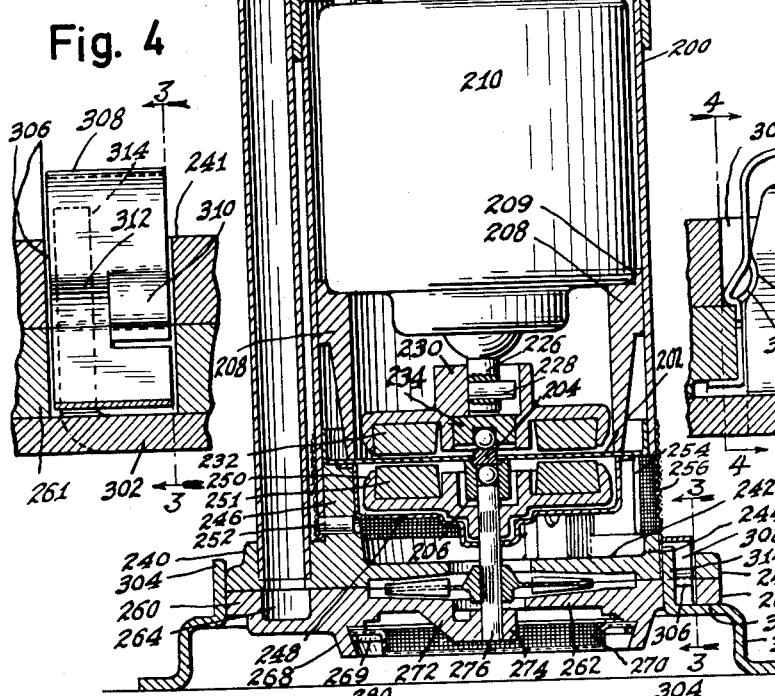

2,996,994
MOTOR-PUMP APPARATUS
George W. Wright, Fort Wayne, Ind., assignor to Tokheim Corporation, Fort Wayne, Ind., a corporation of Indiana
Original application June 9, 1955, Ser. No. 514,221. Divided and this application May 4, 1959, Ser. No. 810,866
6 Claims. (Cl. 103—87)

This invention relates to apparatus for pumping liquid fuel, especially for automotive use, and particularly to a submersible motor-pump unit comprising a centrifugal fuel pump and an enclosed motor coupled by a magnetic coupling operating through an imperforate wall of the motor housing, as more broadly disclosed and claimed in the copending application of William L. Hudson, Serial No. 538,753, filed October 5, 1955, now Patent No. 2,885,126. This application is a division of my copending application Serial No. 514,221, filed June 9, 1955.

It is an object of the invention to provide a pump unit for submerged operation in a body of liquid fuel such as the gasoline in a fuel tank, especially an automotive fuel tank; and more particularly to provide an improved motor and pump assembly in which the form and interrelation of parts is adapted to facilitate commercial production. It is a further object of the invention to provide such a fuel pump unit which is compact and adapted to fit a variety of fuel tanks, including the shallow tanks commonly used in passenger cars and the tall narrow tanks commonly used in trucks; which will be highly reliable in operation and have a long life and require a minimum of service; and which will have such reliability under the adverse mounting and operating conditions of an automotive vehicle.

It is an especial object of the invention to provide a combined fuel-pump and motor unit adapted for mass production at relatively low cost.

Further and more specific objects of the invention will appear from the following specification.

In accordance with one aspect of the invention, the motor of the motor-pump apparatus is formed as a self-contained and permanently enclosed and sealed unit, containing the driving member of the magnetic coupling; and a pump and driven member of the coupling are subsequently assembled to such motor unit and mechanically secured thereto.

In accordance with another aspect of the invention, the motor-pump assembly comprises a tubular housing, preferably in the form of a cylindrical tube, and such tube serves as alining and guiding means for and between the motor and the pump and the coupling parts, to position them in assembled and operating relationship. The motor is alined and guided in the tube, preferably with its shaft co-axial with the tube, and the tube forms the main outer wall of the housing in which the motor is sealed. The lower end wall of the housing is formed by a non-magnetic imperforate wall inserted and sealingly fixed in the tube at a point intermediate its length to provide a downwardly projecting cylindrical skirt accurately positioned in relation to the motor shaft and adapted to aline and guide the pump. The driving and driven members of the magnetic coupling lie on opposite sides of the imperforate wall, which serves as a rigid sealing diaphragm between them. Preferably the motor and especially its shaft and the driving member of the coupling are axially positioned by and in reference to the said imperforate wall. The top end of the motor housing is closed by a cap or other closure member sealingly fixed in place, and such closure member desirably serves as a retaining member to secure the motor in fixed relation to the imperforate wall.

The accompanying drawings illustrate the invention. In such drawings:

FIG. 1 is a vertical section of a pump-motor unit embodying the invention, associated with a bottom mounting;

FIG. 2 is a bottom plan view of the pump-motor unit and mounting shown in FIG. 1;

FIG. 3 is a vertical section taken generally on the line 3—3 of FIG. 1 and more specifically on the line 3—3 of FIG. 4, and showing a mounting clip on an enlarged scale; and FIG. 4 is a section taken on the line 4—4 of FIG. 3.

The assembly shown in the drawing is adapted for quantity production as a substantially permanently assembled unit. The main body of the pump-motor unit comprises a tubular shell 200, conveniently made of commercial tubing. An imperforate wall or diaphragm 202 is inserted in its lower end, and is fixed and sealed in place as by soldering. The center of the diaphragm 202 carries a thrust bearing insert 204 and a depending sleeve bearing 206, which are secured and sealed to the diaphragm as by welding or soldering. Above the diaphragm 202, and shell 200 receives a motor-supporting spacer 208 which may be molded from a synthetic resin material such as nylon and is generally cylindrical in shape. It rests on the diaphragm, and its upper portion fits closely within the shell 200. At three spaced points around its upper edge, it is provided with upward extensions 209 to center the motor 210 within the shell 200.

The motor assembly 210 is inserted within the shell 200 to rest on the upper face of the spacer 208. It is held down, and its upper end is centered, by a stabilizing plate 212 molded of synthetic resin such as nylon. The stabilizing plate is held in place, and the upper end of the shell 200 is closed, by a cap 214 which has a central tubular upward extension 216. This receives a grommet 218 through which the motor leads are passed. Such leads include a live lead 219 and a ground lead 220, the latter being connected to one of the bolts 222 which hold the motor assembly 210 together. The tubular extension 216 of the cap 214 is connected and sealed to a conduit 224 which carries the motor leads and serves to stabilize the mounting described below. The conduit is desirably sealed, as with a mass of sealing compound 225.

The motor shaft 226 is carried by radial and thrust bearings in the motor 210 and its lower end projects downwardly and is provided with a drive pin 228. The driving member 230 of a magnetic coupling is slidably and drivingly mounted on the end of the shaft 226, and carries an annular magnet 232. The magnet is conveniently a pressed ferrite magnet, magnetized after assembly in its carrier 230 to provide four circumferentially spaced poles at its lower face. The member 230 may be an anodized aluminum casting provided at its center with a hardened cup-shaped thrust bearing insert 234 which rides on a thrust ball between itself and the diaphragm insert 204.

The shell 200 projects a short distance below the diaphragm 202, and slidably receives a pump body casting 240 to guide and aline the same with respect to the motor 210 and the magnetic driving member 230. Such casting forms the upper wall 242 of the pump casing, and has a rim 244 which lies in proximate relation to the lower edge of the shell 200. Three circumferentially spaced posts 246 extend upward from the pump body 240 and fit closely within the lower end of the shell 200. Their upper ends abut the lower face of the diaphragm 202, and support a shroud 248 which forms a housing for the driven member 250 of the magnetic coupling. The pump body 240 is conveniently secured in place by one or more pins 252 pressed into alined holes in the shell 200 and the legs 246.

The lower end of the shell 200, between the posts 246, is punched to provide inlet openings 254, and these are covered by a screen 256 wrapped around the lower end of the shell 200 and overlapping the rim 244 of the body 240.

The lower half of the pump casing is formed by a cover 260, which provides the lower wall 262 of the pump housing. A volute 264 is formed by the pump body and cover, around the pump chamber, and leads to a socket in the pump body 240 which receives the lower end of the discharge pipe 266.

The bottom throat of the pump is formed in the bottom pump casing wall 262, and is bridged by a spider 272 which supports a bearing sleeve 274 for the lower end of the pump shaft 276. The bearing sleeve may be integral and homogeneous with the cover 260 when that cover is made of a bearing material. The bottom throat is protected by a screen 270 fitted within a tapering collar 268 on the body 260 and held in place by a snap ring 269.

The pump shaft 276 is journaled at its ends in the sleeve bearing 206 on the diaphragm and in the bearing sleeve 274 of the pump cover. Its upper end face forms a thrust bearing riding against a thrust ball received between it and the diaphragm insert 204.

The driven member 250 of the magnetic coupling is similar in construction to the driver member 230, and carries a companion magnet 251 magnetized after assembly in its carrier to provide magnetic poles at its upper face in positions for alinement with the poles of the driving magnet 231. The driven member 250 is fixed on the upper end of the pump shaft 276, as by a press fit on a knurled section of the shaft, and the magnetic traction holds the shaft upward against the thrust bearing and fixes its axial position. The shroud 248 encloses the driven member 250 to prevent agitation and stirring of the liquid in the tank by the rotation of that member 250.

The pump impeller has a central hub which is pressed on a knurled section of the pump shaft 276, and has a circular central web of smooth and uninterrupted surface configuration within the throats of the pump, and such web supports spaced impeller blades which revolve in the pump chamber defined by the walls 242 and 262.

The pump body 240 and cover 260 are provided with peripheral flanges 241 and 261 and are secured together by four rivets 280 passed through such flanges at spaced points around the periphery of the pump. The flanges may be used as a mounting for the pump and motor assembly.

In the mounting shown, the pump-motor unit is carried by its flanges 241 and 261 on a bracket 300 secured to the bottom wall of a tank 52. The bracket has a raised mounting plate 302, with downwardly offset feet at its end edges which support the plate above the bottom of the tank. The pump flanges 241 and 261 are of unsymmetrical peripheral shape, and mounting plate 302 is punched to provide an opening of generally similar unsymmetrical shape. To orient the pump with respect to the bracket 300, the plate 302 carries four upturned guide posts 304, and the flanges of the pump are provided with flat outer faces in complementary relationship with the inner faces of those posts 304. The relationship permits the pump to be inserted in only a single position, and the posts 304 loosely receive and guide the pump housing as it is inserted.

The pump is secured in place on the bracket by snap fasteners, comprising clips carried by either the pump and bracket and engaged with retainers carried by the other. As shown, the assembled flanges 241 and 261 are provided with three circumferentially spaced rectangular openings 306, with that portion of each opening which lies in the flange 241 being slightly wider than the portion which lies in the cover 260. A generally U-shaped spring clip 308 is inserted upwardly in each of the openings 306. At the outer side of the central plane of each clip, its side walls are deformed outward to form clip-retaining fingers or lugs 310 which engage over the upper edges of the pump body flange 261 to retain the clip in its opening 306. At the inner side of the central plane of each clip 308, its side walls are deformed inward to form spring latches 312. For cooperation with the three clips 308, the bracket plate 302 carries three upturned retaining fingers 314 which have notches 316 in their side edges, as shown in FIG. 3, to receive the spring latches 312. The guide posts 304 orient the pump in proper relationship with the bracket, and aline the clips 308 with the retaining fingers 314, and when the pump is then pressed downward to its mounting position, the spring latches 312 engage over the retaining fingers 314 and in the notches 316 to secure the pump assembly on the mounting bracket 300.

The top wall of the fuel tank 52 is provided with a suitable opening for insertion of the pump-motor assembly, and such opening is closed by a cover plate 320. Such cover plate has a central opening containing an elastic grommet 322 to closely embrace the upper end of the conduit 224 at the top of the motor and pump assembly. The upper end of the grommet 322 is closed by a terminal shield 324 through which the leads 219 and 220 are passed. The plate 320 also carries a pump discharge fitting 326, in communication with a depending socket 328 which receives the upper end of the pump discharge pipe 266. The upper end of such pipe desirably carries an elastic grommet 330 which frictionally engages the wall of the socket 328.

In mounting the pump, the pump-motor assembly, including a discharge pipe 266 carried in the socket of the pump body, is inserted through the opening in the tank top wall, is properly oriented with respect to the bracket 300 by engagement of the flanges 241 and 261 between the posts 304, and is then pressed firmly downward to engage the retaining posts 314 in the clips 308 carried in the openings 306 of the pump flanges. The cover plate 320 is then applied to the top tank wall. The motor leads 219 and 220 are led up through the grommet 322, and that grommet is then engaged over the end of the conduit 224, and the socket 328 is engaged over the end of the grommet 330 carried by the discharge pipe 266. The plate is then pressed downward to its seated position on the tank top wall and is secured in place. The conduit 224 serves a supplementary mounting function, as noted above, for its engagement in the grommet 322 stabilizes the upper end of the assembly, to suppress vibration and prevent rocking movements which might tend to dislodge the pump from its mounting bracket 300. The grommets 322 and 330 prevent transmission of vibration to the top wall of the tank.

The conduit 224 and discharge pipe 266 can be made of any desired length to suit the depth of the tank in which the assembly is mounted. Thus, in a shallow passenger car tank, the conduit 224 will usually be relatively short, and the relationship may be substantially that shown in FIG. 1; while in a tall tank such as is commonly used in trucks, the conduit 224 and pipe 266 may be quite long.

In the motor-pump unit shown, the motor 210 and the driving member 230 of the coupling are completely enclosed in the compartment formed above the imperforate wall or diaphragm 202, and such compartment is permanently and hermetically sealed, particularly from the tank. While the compartment might be permitted to breathe to the atmosphere outside the tank, by providing for leakage past the grommet 218 in the conduit 224 and along the wire leads 219 and 220 where they pass through the terminal shield, I prefer that the assembly be permanently sealed. In such care, the motor compartment may be filled with a controlled atmosphere favorable to motor operation and life.

Operation of the motor rotates the driver 230 of the magnetic coupling, and the driven member 250, being magnetically coupled thereto, is driven at the same speed. The torque required for normal operation of the small centrifugal pump is readily transmitted by the coupling, and the coupling effect is desirably limited to a value sufficient for normal pump operation but less than the normal torque of the motor and less than sufficient to reestablish itself during operation once it is broken. If the pump should become locked, the coupling effect would then be broken and the motor would run free, without danger of overheating or burning out.

I claim as my invention:

1. A motor-pump unit adapted for submerged operation in a body of liquid such as gasoline, comprising a cylindrical tube, an imperforate wall sealingly fixed in said tube intermediate the length thereof, a motor assembly having a shaft and bearings supporting the same, motor-support means centered and guided in said tube and located axially therein by engagement with said imperforate wall, said means supporting said motor assembly in the tube in predetermined relation to one side of said wall with its shaft substantially coaxial with said tube, a cover closing the motor-containing end of the tube for enclosing the motor assembly in the tube between said wall and cover, means coacting with said cover to retain said motor assembly in supported relation with said motor support, a pump having a shaft and a housing, pump-locating means on said housing disposed substantially coaxially with said pump shaft and received in and guided by said tube for supporting said pump with its shaft substantially coaxial with said tube at the opposite side of said wall from said motor shaft and substantially coaxial with said motor shaft, said pump-locating means coacting with said imperforate wall to position said pump in predetermined relation axially of said tube, means for holding said pump housing in assembled relation with said tube, and magnetic coupling means including driving and driven members operatively connected to said motor and pump shafts respectively on opposite sides of said imperforate wall and magnetically coupled therethrough for operatively connecting said shafts.

2. A motor-pump unit according to claim 1, with the addition of thrust bearing means between said imperforate wall and each of said motor shaft and said pump shaft to fix said shafts axially with respect to each other and to said motor assembly and pump housing.

3. A motor-pump unit according to claim 1, including means engaging and guided by said tube for positioning the upper end of said motor in said tube, said means being retained in motor-positioning relation by said cover.

4. A motor-pump unit according to claim 1, including a tubular motor support received in said tube and engaged against said imperforate wall, said support serving to space the motor from the wall to define a chamber therebetween for housing said driving means.

5. A motor-pump unit adapted for submerged operation in a body of liquid such as gasoline, comprising a cylindrical tube, an imperforate wall sealed in said tube adjacent its lower end, a motor assembly having a shaft and bearings supporting the same, means cooperating with said tube as a guide for supporting said motor assembly in the tube with its shaft substantially coaxial with the tube, a cover enclosing the motor in the tube beween said wall and said cover, a pump having a shaft and a housing, means cooperating with said tube as a guide for supporting said pump in and substantially proximate to the end of the tube with the shaft of the pump substantially coaxial with the tube and with the motor shaft on the opposite side of said wall from the motor shaft, and magnetic coupling means on opposite sides of said wall and operatively connecting said motor and pump shafts, said pump housing defining a top inlet throat facing said imperforate wall, said tube having a relatively large opening therein below said imperforate wall for establishing communication between said throat and the space surrounding the motor-pump unit to admit liquid thereto from a body of liquid in which the unit is mounted.

6. A motor-pump unit according to claim 5, which includes means for supporting said tube substantially vertically in the body of liquid, and wherein said pump releases gas upward through said throat, said opening in the tube extending substantially to said diaphragm so that gas discharged from said throat may escape from said tube above the level of liquid flowing to said throat through the opening.

References Cited in the file of this patent

UNITED STATES PATENTS

| | | |
|---|---|---|
| 2,230,717 | Lancey | Feb. 4, 1941 |
| 2,370,590 | Taylor | Feb. 27, 1945 |
| 2,463,409 | Moody | Mar. 1, 1949 |
| 2,729,962 | Hicklin | Jan. 10, 1956 |